Aug. 6, 1940.      K. M. HENRY      2,210,583
MOLD
Filed March 4, 1939      2 Sheets-Sheet 1

INVENTOR.
K. M. Henry,
BY Rule & Hoge
ATTORNEYS.

Aug. 6, 1940.    K. M. HENRY    2,210,583
MOLD
Filed March 4, 1939    2 Sheets-Sheet 2
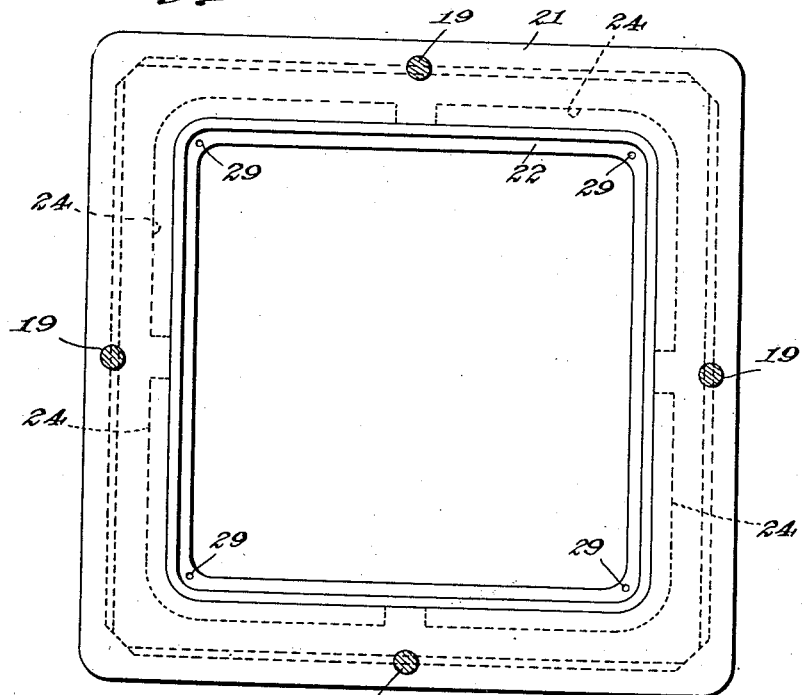
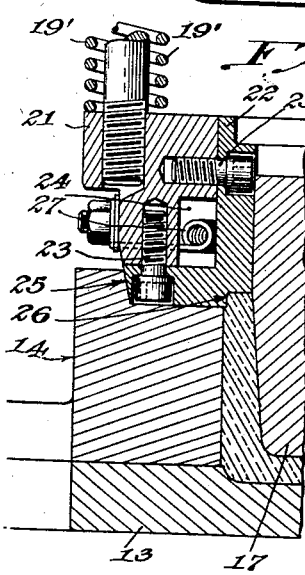
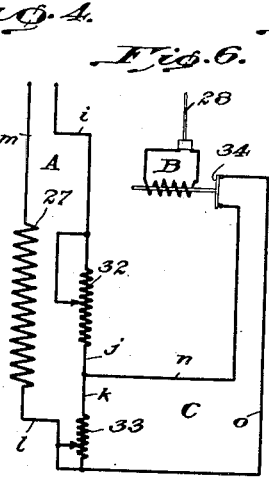
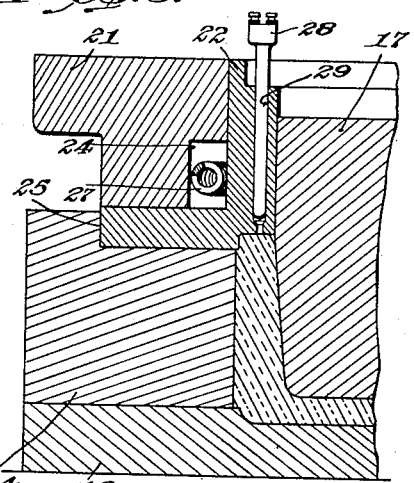
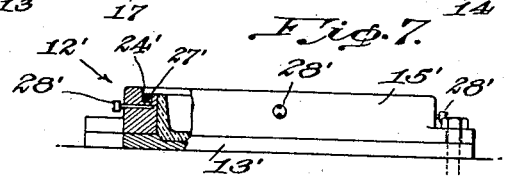
INVENTOR.
K. M. Henry,
BY Rule & Hoge
ATTORNEYS.

Patented Aug. 6, 1940

2,210,583

UNITED STATES PATENT OFFICE 2,210,583

MOLD

Kenneth M. Henry, Maumee, Ohio, assignor to Owens-Illinois Glass Company, a corporation of Ohio Application March 4, 1939, Serial No. 259,832

7 Claims. (Cl. 49—68)

The present invention relates to glassware forming machines and more particularly to electrically heated mold parts designed for use in connection with such machines.

The invention is designed especially for use in connection with glassware forming machines of the type adapted to produce half-sections of a hollow hermetically sealed building block, but by slight modification thereof, may be employed in connection with forming machines adapted to produce a variety of glass articles having relatively thick walls.

One commercial type of forming apparatus for producing half-section of a glass building block includes an upwardly facing relatively shallow open mold in which a charge of molten glass is placed and shaped to final form by the pressing action of a die which is lowered into the mold cavity into contact with the molten charge. During the pressing operation, the molten glass is forced upwardly along the sides of the die and into the space existing between the outer walls of the die and the inner walls of the mold cavity. Such upward movement of the glass is limited by the presence of a spring pressed mold ring which surrounds the die and which, in addition to giving shape to the upper rim of the hollow article, also functions during the withdrawal of the die to hold the molded glass article in the mold or against the bottom plate thereof, thus stripping the article from the die.

In order to produce articles of a uniformly good character, it is desirable that the mold ring be maintained at a relatively high temperature for otherwise flaws will occur in the completed articles. Heretofore direct heat exchange by conduction has been relied upon to maintain the mold ring sufficiently hot to produce articles which are free from flaws and under such condiions it has been necessary to maintain a constant and relatively high rate of production in order that the mold ring may, by relatively frequent contact with the hot glass, remain at a high temperature. Even with the machine operating at high speed, difficulty has been encountered in producing articles which are free from flaws due to the tendency of the mold ring to run cold. Furthermore, uneven heating of the ring has been encountered with a consequent production of defective articles.

Various attempts have been made to remedy the above outlined limitations that are attendant upon the manufacture of glass block half-sections and among these have been the insertion in the ring of pieces of iron which were calculated to impart to the ring the ability to maintain its residual heat with less loss of heat through radiation. Such attempts however have not been altogether satisfactory and optimum temperature conditions have not been attained.

The present invention is designed to overcome the above noted limitations by the provision of a means for applying external heat to the mold ring and to control the application of such heat in such a manner that even and adequate heating of the mold ring will be attained.

This being the principal object of the invention, it is another object thereof to provide a mold ring construction having a replaceable part which is subject to the greatest amount of wear and which, when worn, may be discarded thus making it unnecessary to discard and replace the entire mold ring.

The provision of a mold ring which is relatively simple in its construction; one which is rugged and durable; and one which requires no elaborate modification of the machine proper for its assembly and operation thereon, are further desirable features that have been borne in mind in the production and development of the present invention.

In the accompanying drawings:

Fig. 3 is a top plan view of the mold ring construction;

Fig. 4 is a fragmentary vertical transverse sectional view taken through one side of a forming mold and die therefor showing the mold ring construction operatively associated therewith;

Fig. 5 is a sectional view similar to Fig. 4 but taken diagonally through one corner of the mold structure;

Fig. 6 is a diagrammatic view showing an alternative circuit that may be employed for heating the mold ring construction; and Fig. 7 is a side elevational view, partly in section, of a mold structure embodying the principles of the present invention.

Figure 1:
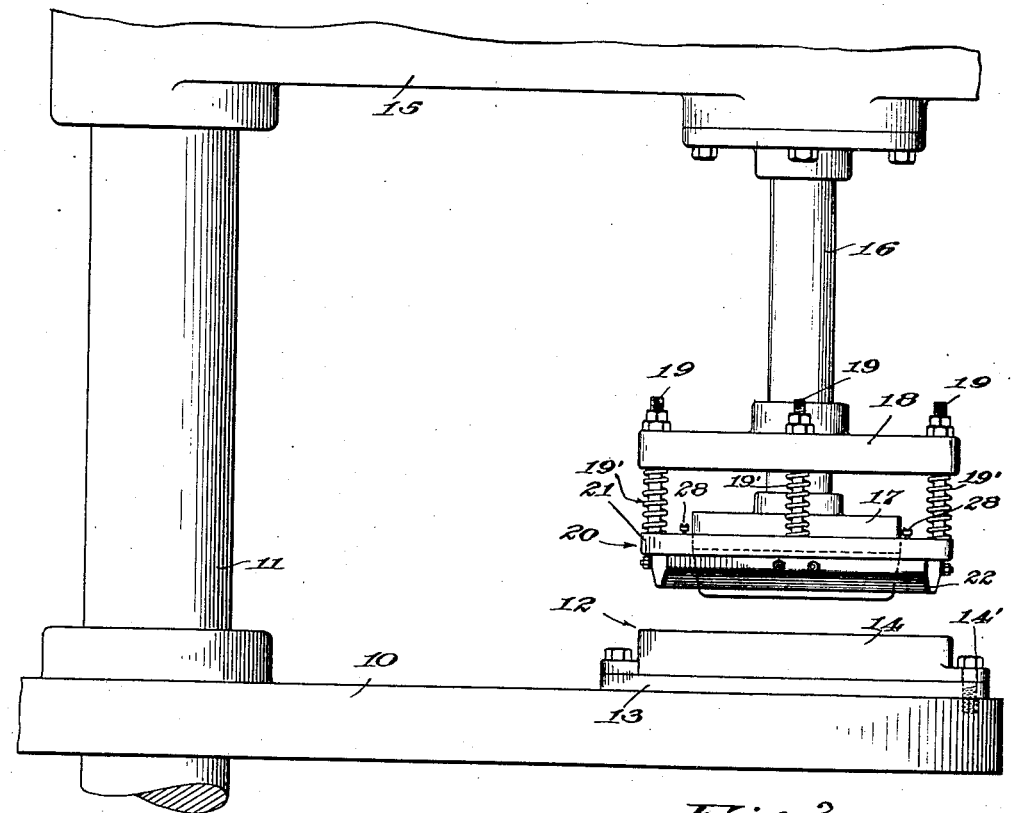
Fig. 1 is a fragmentary side elevational view of a forming machine showing the improved mold ring construction applied thereto.

Referring now to Fig. 1, the forming machine includes a rotary mold table 10 mounted on a central support or column 11 and having disposed thereon a series of spaced molds 12, only one of which is shown. The mold 12 includes a bottom plate 13 secured to the table 10 and having associated therewith separable mold sections 14 hinged together as at 14' and representing the mold sides.

An arm 15 mounted upon the support 11 overlies the table 10 and serves to support a vertically slidable plunger 16 which carries at its lower end a forming die 17. A cross-head 18 is mounted on the plunger 16 above the level of the die 17 and suspended therefrom by means of guide rods 19 which extend through the cross-head 18, is a mold ring assembly 20. Pressure springs 19' surround the guide rods 19 and serve to normally urge the mold ring assembly 20 downwardly. The function of the mold ring assembly 20 is to cooperate with the mold 12 and die 17 in giving shape to the upper edge of the block half-section as shown in Fig. 4, and also to hold the completed article in the mold during withdrawal of the die 17.

The mold ring assembly 20 is comprised of two main parts or rings, an outer ring 21 and an inner ring 22. The outer ring is generally of T-shape cross section and is formed with recesses therein extending around each corner thereof while the inner ring is generally of L-shape cross section. The two parts are assembled upon each other and secured together by means of studs 23 thus forming hollow spaces or chambers 24 in the corner regions of the assembly.

The upper surfaces of the mold sections 14 are formed with shallow recesses 25 therein into which the lower portion of the inner ring 22 fits when the plunger 16 is in its lowered position. A recess 26 in the inner ring serves to shape the upper edge of the glass block half-section when the die 17 is in cooperation with the mold and the surface provided by this recess 26 limits the upward flow of glass into the space existing between the die and walls of the mold cavity.

According to the present invention, means is provided for heating and accurately controlling the temperature of the mold ring assembly 20 and toward this end a plurality of electrical heating units 27 in the form of resistance wires, are disposed in the spaces 24 existing between the inner and outer rings. Four such units 27 have been disclosed, each extending around one corner of the ring for the purpose of localizing the application of heat to the ring. The operation of each unit 27 is regulated by means of a thermocouple 28 which is disposed in a bore 29 provided adjacent the corner of the ring assembly 20 in the inner ring 22.

Figure 2:
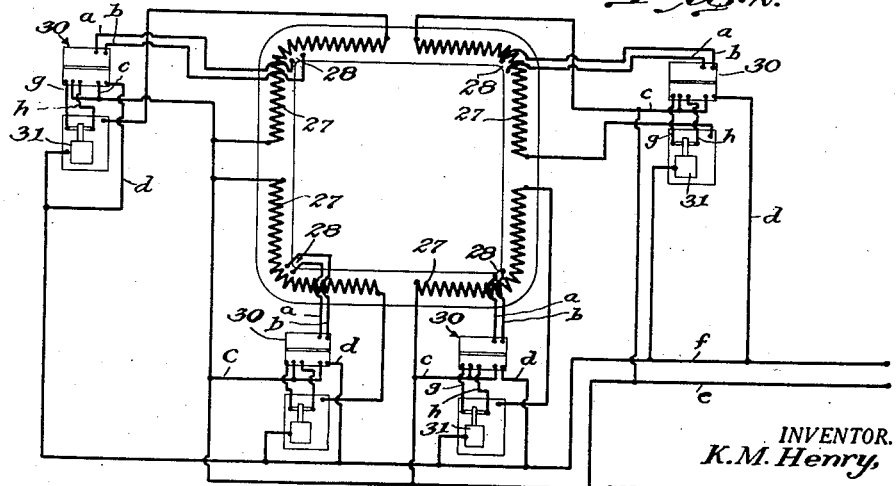
Fig. 2 is a diagrammatic view of one electrical circuit that may be employed for heating the mold ring construction.

According to the preferred manner of regulating the current conducted to the heating units 27, wires a and b (Fig. 2) lead from each thermocouple 28 to a suitable relay of standard design and which is designated generally at 30 and by means of which the supply of heating current for energizing the unit 27 adjacent the thermocouple is regulated either to establish or to interrupt such supply of current.

The relays 30 are identical in construction and, being of standard design, no claim is made herein to any novelty associated therewith. The relays have been schematically illustrated and the wires leading thereto are the thermocouple leads a and b previously mentioned, the power input wires c and d leading from the main current supply wires e and f, and a pair of wires g and h leading to the relay switch 31. The relay circuits are so designed that when the temperature of any one corner region of the ring assembly 20 falls below a predetermined minimum, the respective switch 31 becomes closed to supply current to the heating unit 27 associated therewith to raise the temperature of the surrounding portion of the ring assembly. Conversely, when the temperature of such a corner region attains a predetermined maximum, the switch 31 becomes opened to shut off the supply of current to the heating unit 27 associated therewith.

In Fig. 6 a modified form of relay cicuit is illustrated and by means of which current is supplied continuously to the heating units 27 from a source through a circuit designated generally at A and including a wire $i$, a manually controlled variable resistance 32, wires $j$ and $k$, variable by-pass resistance 33, wire $l$, heating unit 27 and wire $m$. Because the current flows through both resistances 32 and 33, the amount of heat generated by the unit 27 is moderate and is calculated to maintain the localized region of the ring construction which it controls at the proper temperature for optimum forming conditions. Should for any reason whatsoever the temperature of the ring in the localized region thereof adjacent the thermocouple 28 drop below a predetermined minimum, the thermocouple, acting through a circuit B, actuates the relay switch 34 to close a by-pass circuit C, and shunt the variable by-pass resistance 33 out of the circuit A, thus causing current to follow the path through wires $i$, resistance 32, wire $n$, switch 34, wires $o$ and $l$, heating unit 27 and wire $m$. Thus it will be seen that the current input to the heating unit 27 will be increased and the localized region of the mold ring construction brought up to the desired temperature.

In the specific embodiment of the invention thus far described automatic regulatory means have been applied to the mold ring assembly 20 to maintain the same at a temperature most suitable for efficient formation of the half-sections of the hollow glass building blocks. Under other conditions of manufacture, whether the articles undergoing formation are such block half-sections or other articles, it may be desirable to similarly regulate the temperature of any or all of the other mold parts. In Fig. 7 there is shown a mold 12' including a bottom plate 13' having associated therewith separable mold sections 15', representing mold sides. Heating elements or units 27' are disposed in recesses 24' formed in the sections 15' and the supply of current to the units 27' is regulated by means of thermocouples 28' which are connected in parallel circuits similar to those illustrated in Figs. 2 or 6 and previously described in detail.

Obviously, such heating elements or units and the controlling thermocouples and circuits therefor might well be applied to the mold bottom plate 13' or to any other mold part without departing from the spirit of the invention. Likewise, it is contemplated adapting the principles of the invention to use in connection with mold parts which are utilized for forming hollow blown glassware as well as for pressed ware.

Various other modifications are contemplated within the spirit and scope of the appended claims.

I claim:

1. In a glassware forming machine, a mold including a plurality of separable mold parts designed when assembled upon each other to form a mold cavity in which a charge of molten glass is pressed to produce an article, one of said mold parts being hollow, an electrical heating unit in said hollow mold part, a thermostat in said hollow mold part responsive to heat generated by said unit, and a relay circuit of which the thermostat forms a part for supplying heating current to the heating unit.

2. In a glassware forming machine, a mold including a plurality of separable mold parts designed when assembled upon each other to form a mold cavity in which a charge of molten glass is pressed to produce an article, one of said mold parts being hollow, a plurality of electrical heating units in said hollow mold part, a plurality of thermostats in the hollow mold part each responsive to one of the heating elements and a relay circuit for each thermostat of which the latter forms a part for supplying heating current to the respective heating unit to which the thermostat is responsive.

3. A hollow mold ring of generally rectangular configuration having a surface designed for intimate contact with a charge of molten glass in a mold in the production of hollow glass articles, an electrical heating unit disposed in said hollow mold ring adjacent each corner thereof, and means for selectively supplying heating current to said heating units.

4. A hollow mold ring of generally rectangular configuration having a surface designed for intimate contact with a charge of molten glass in a mold in the production of hollow glass articles, an electrical heating unit disposed in said hollow mold ring adjacent each corner thereof, a thermocouple extending into the ring adjacent each heating unit and responsive to heat generated thereby, and a relay circuit for each thermocouple for supplying heating current to the respective heating unit to which the thermocouple is responsive.

5. In a mold ring construction designed for use in stripping pressed glass articles from a forming die of a glassware forming machine, inner and outer mold ring parts forming a continuous chamber therebetween, and a plurality of electrical heating units disposed in said chamber in spaced relationship.

6. In a mold ring construction designed for use in stripping pressed glass articles from a forming die of a glassware forming machine, inner and outer metal mold ring parts forming a continuous chamber therebetween, a plurality of electrical heating units disposed in said chamber in spaced relationship, and a thermocouple extending into the metal of one of the mold ring parts adjacent each heating unit.

7. In a mold ring construction designed for use in stripping pressed glass articles from a forming die of a glassware forming machine, inner and outer metal mold ring parts forming a continuous chamber therebetween, a plurality of electrical heating units disposed in said chamber in spaced relationship, and a thermocouple extending into the metal of the inner mold ring part adjacent each heating unit.

KENNETH M. HENRY.